(12) United States Patent
Yildirim et al.

(10) Patent No.: US 11,988,623 B2
(45) Date of Patent: May 21, 2024

(54) QUANTITATIVE ANALYSIS METHOD FOR FIBER COMPOSITIONS

(71) Applicant: BURSA TEKNIK UNIVERSITESI, Bursa (TR)

(72) Inventors: Kenan Yildirim, Bursa (TR); Seher Cihan Usul, Bursa (TR)

( * ) Notice: Subject to any disclaimer, the term of this patent is extended or adjusted under 35 U.S.C. 154(b) by 743 days.

(21) Appl. No.: 17/272,389

(22) PCT Filed: Aug. 29, 2019

(86) PCT No.: PCT/TR2019/050715
§ 371 (c)(1),
(2) Date: Mar. 1, 2021

(87) PCT Pub. No.: WO2020/046254
PCT Pub. Date: Mar. 5, 2020

(65) Prior Publication Data
US 2021/0325325 A1    Oct. 21, 2021

(51) Int. Cl.
G01N 25/00    (2006.01)
G01N 25/48    (2006.01)

(52) U.S. Cl.
CPC .............. G01N 25/4866 (2013.01)

(58) Field of Classification Search
CPC .............................. G01N 25/4866
See application file for complete search history.

(56) References Cited

FOREIGN PATENT DOCUMENTS

| CN | 103282576 A | * | 9/2013 | ........ D06M 15/277 |
| CN | 104684962 A | * | 6/2015 | ........ C08G 63/183 |
| CN | 106917160 A | * | 7/2017 | ........ C08G 63/672 |
| CN | 108048946 A | * | 5/2018 | ............ D01F 1/07 |
| EP | 0456306 A1 | * | 11/1991 | |
| EP | 3236247 A1 | * | 10/2017 | |
| EP | 3236247 A1 | | 10/2017 | |

OTHER PUBLICATIONS

17272389_2024-02-12_CN_103282576_A_H.pdf,Sep. 4, 2013*
17272389_2024-02-12_CN_104684962_A_H.pdf,Jun. 3, 2015.*
17272389_2024-02-12_CN_106917160_A_H.pdf, Jul. 4, 2017.*
17272389_2024-02-12_CN_108048946_A_H.pdf,May 18, 2018.*
17272389_2024-02-12_EP_0456306_A1_H.pdf, Nov. 13, 1991.*
17272389_2024-02-12_EP_3236247_A1_H.pdf, Oct. 25, 2017.*
International Search Report for corresponding PCT/TR2019/050715, dated Jul. 9, 2020.
Written Opinion of the International Searching Authority for corresponding PCT/TR2019/050715, dated Jul. 9, 2020.
Hideo Kubota, "Curing of highly reactive polyester resin under pressure: Kinetic studies by differential scanning calorimetry" Journal of Applied Polymer Science, doi:10.1002/app.1975.070190819, Jan. 8, 1975 (See Written Opinion for Discussion of Relevance).
Yang Y S; James Lee L; Tom Lo S K; Menardi P J "Monitoring the cure of unsaturated polyester resins by pressure DSC and FTIR-PLC" Journal of Applied Polymer Science, John Wiley 3782313-2330ISSN 0021-995 http://dx.doi.org/10.1002/app.1989.070370821, Jan. 4, 1989 (See Written Opinion for Discussion of Relevance).

* cited by examiner

*Primary Examiner* — Gail Kaplan Verbitsky
(74) *Attorney, Agent, or Firm* — Egbert, McDaniel & Swartz, PLLC

(57) ABSTRACT

The present invention relates a fiber analysis method for determining ratio of components in the fiber comprising hydrophobic fiber component and thermoplastic fiber component.

18 Claims, 1 Drawing Sheet

DSC thermogram

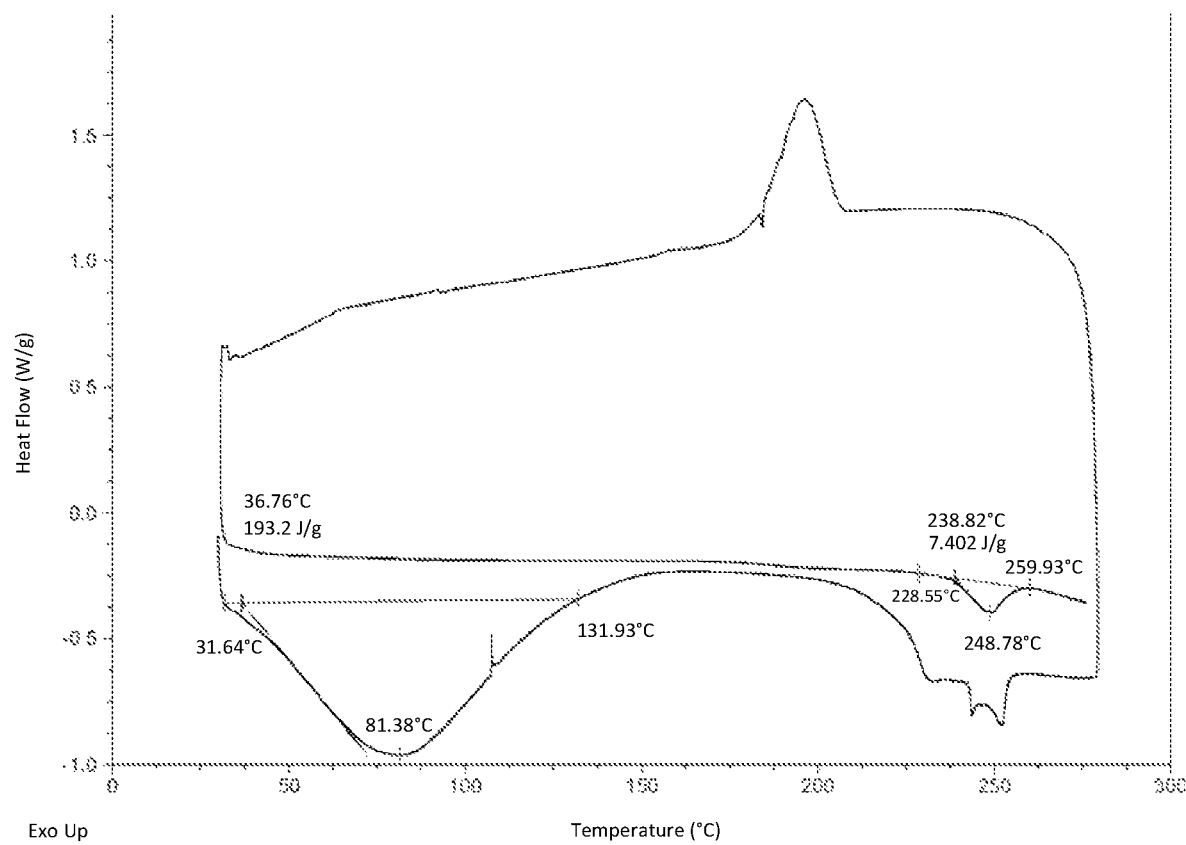
DSC thermogram

QUANTITATIVE ANALYSIS METHOD FOR FIBER COMPOSITIONS

TECHNICAL FIELD

The Invention relates to a differential scanning calorimetry (DSC) analysis which can be applicable determining fiber ratio in the fibers blend like wool/polyester.

PRIOR ART

Fiber mixture is used for manufacture fabric which is used as upholstery, mattress and apparel. The fibers ratio of the mixture influences the price and the properties such as comfort, performance and utility of the fabric.

Especially, Wool/Polyester (PET) fiber mixture also mostly produced for making upholstery and apparel fabric. Wool is good material for fashion, carpet and floor cover, military and sport apparel. Wool fiber has thermal and moisture management, flame retardant, comfort, odor absorption and UV protection properties because of that it is used in the military and industrial application.

With the currently most of the wool based product agreement like military apparel, airplane carpet include critical specification about wool fiber ratio. Beside that custom tariff is based on the fiber ratio in the mixture textile products. Because of that determining fiber mixture ratio is very important for both manufacturer and costumer.

Fiber composition analysis is carried out according to TS 1700, TS 4785 and ISO 1833 standard series. General principles of quantitative chemical analysis are carried out with TS EN ISO 1833-1, protein fiber in mixture is determined according to TS EN ISO 1833.

TS EN ISO 1833-4 method is explained basically as follows:

Sodium hypochlorite implemented to a specific amount of fiber mixture and dissolved it in alkali environment. The remaining fiber is washed and subsequently dried. Then, the weight of the remaining fiber is determined. Dissolved wool fiber weight is determined by subtracting remaining fiber weight from total fiber weight. The affection status of undissolved fiber from hypochlorite is balanced by a calibration coefficient.

One disadvantage of this method is low repeatability due to variance of the hypochlorite. After every analysis, the variance in sodium hypochlorite and concentration increase the error margin of repeating tests.

Another known disadvantages of this method are; the requirement of fresh sodium hypochlorite use and, heat energy, labor and time waste due to conducting analysis on dry weight basis.

Additionally, repeating weighing processes, plural apparatus use, duration of test (about 2 days), skilled labor force requirement and water-chemical compounds waste also decrease the preferability of the method.

Besides these, solvent can also disrupt the analysis result by dissolving or damaging structures other than the fiber that is expected to be dissolved.

Consequently, all above mentioned facts obligate to innovate at the related field.

OBJECTIVES OF THE INVENTION

The aim of present invention is to present a new quantitative analysis method for determining fiber composition which allows to remove the disadvantage of the standard analysis method and making technical novelty.

The main aim of the invention is to present a method structure which comprises the use of Differential Scanning calorimetry (DSC) analysis for providing component quantity analysis at fiber types comprising different types of components, for example wool and polyester.

Another aim of the invention is to provide the structure of the analysis method to determine the quantity of the components in a fiber which comprises a mixture of a hygroscopic component and a component that does not hold liquid (hydrophobic) or can hold spare water to be ignored.

Another aim of the present invention is to present a new quantitative analysis method for determining fiber composition which has consistent repeatability, is rapid and not required skilled labor force and chemical usage.

Another aim of the present invention is to provide compound quantity analysis method for fiber comprising wool-PET mixture.

Another aim of the present invention is to provide an alternative analysis method to ISO EN 1833-4 standard which has limited boundaries.

Another aim of the present invention is to provide analysis method having high repeatability.

Another aim of the present invention is to provide a safe and environmentally friendly analysis method by preventing the use of harmful chemicals.

Another aim of the invention is to shorten the analysis process and eliminate the need for qualified employee for the relevant analysis.

BRIEF DESCRIPTION OF THE INVENTION

In order to realize all aims mentioned above and emerged from detailed explanations below, the present invention is a fiber analysis method for determining ratio of components in the fiber mixture comprising hydrophobic fiber component and thermoplastic fiber component. The method comprises the following steps;

a) putting of sufficient amount of fiber in the DSC device,
b) application of thermal cycle,
c) recording of liquid output peak area of the hygroscopic composition and/or melting peak area of thermoplastic fiber read from thermogram obtained from DSC as a result of thermal cycle,
d) recording of indium peak area read from thermogram obtained from DSC a result of thermal cycle, and
e) application of liquid output peak area and/or melting peak area with indium peak area to an equation formed to find the ratio of a hygroscopic composition and/or the ratio of thermoplastic fiber.

In the preferred embodiment of the invention, thermal cycle includes steps to increase at least the analyzed fiber from a constant temperature to a determined point of temperature at a determined speed.

In another preferred embodiment of the invention, in order to find the ratio of a hygroscopic composition, water output peak area and indium peak area are applied to the following equation $$y=(Ax+B)k$$

wherein "y" is fiber ratio of the hygroscopic component, "x" is water output peak area, "k" is indium peak area, "A" and "B" are coefficients determined according to the components.

In one another preferred embodiment of the invention, in order to find the ratio of the thermoplastic component, melting peak area and indium peak area are applied to the following equation $$y=(Ax+B)k$$

wherein "y" is ratio of the thermoplastic component, "x" is the melting peak area, "k" is indium peak area, "A" and "B" are coefficients determined according to the components.

In another preferred embodiment of the invention, in order to find the ratio of the thermoplastic component, water output peak area and indium peak area are applied to the following equation $$y=(Ax+B)k$$

wherein "y" is fiber ratio of the thermoplastic component, "x" is the water output peak area, "k" is indium peak area, "A" and "B" are coefficients determined according to the components.

In a preferred embodiment of the invention, the second thermal cycle is provided by DSC, and water output peak area in the first thermal cycle and melting peak area in the second thermal cycle are determined.

In another preferred embodiment of the invention, the second thermal cycle includes the steps of increasing at least the analyzed fiber from a constant temperature to a determined point of temperature at a determined speed.

In order to realize all aims mentioned above and emerged from detailed explanations below, the present invention is a fiber analysis method for determining ratio of components in the fiber comprising a hydrophobic natural fiber component and a thermoplastic fiber component. The method comprises the following steps;
 a) putting the sufficient amount of fiber in the DSC device,
 b) application of thermal cycle,
 c) recording of liquid output peak area of hygroscopic natural fiber composition and/or melting peak area of thermoplastic fiber read from thermogram obtained from DSC as a result of thermal cycle,
 d) recording of indium peak area read from thermogram obtained from DSC a result of thermal cycle, and
 e) application of water output peak area and/or melting peak area with indium peak area to an equation formed to find the ratio of a hygroscopic natural composition and/or the ratio of thermoplastic fiber.

In a preferred embodiment of the invention, thermal cycle provides the steps of increasing at least the analyzed fiber from a constant temperature to a determined point of temperature at a determined speed.

In another preferred embodiment of the invention, in order to find the ratio of a hygroscopic composition, water output peak area and indium peak area are applied to the following equation $$y=(Ax+B)k$$

wherein "y" is fiber ratio of the hygroscopic component, "x" is water output peak area, "k" is indium peak area, "A" and "B" are coefficients determined according to the components.

In one another preferred embodiment of the invention, in order to find the ratio of the thermoplastic component, melting peak area and indium peak area are applied to the following equation $$y=(Ax+B)k$$

wherein "y" is ratio of the thermoplastic component, "x" is the melting peak area, "k" is indium peak area, "A" and "B" are coefficients determined according to the components.

In another preferred embodiment of the invention, in order to find the ratio of the thermoplastic component, water output peak area and indium peak area are applied to the following equation $$y=(Ax+B)k$$

wherein "y" is fiber ratio of the thermoplastic component, "x" is the water output peak area, "k" is indium peak area, "A" and "B" are coefficients determined according to the components.

In a preferred embodiment of the invention, a second thermal cycle is provided by DSC and the water output peak area is determined in the first thermal cycle and the melting peak area is determined in the second thermal cycle.

In another preferred embodiment of the invention, the second thermal cycle provides the steps of increasing the fiber analyzed at least from a constant temperature to a determined point of temperature at a determined speed.

In order to realize all aims mentioned above and emerged from detailed explanations below, the present invention is a fiber analysis method for determining ratio of components in the fiber comprising wool and polyethylene terephthalate (PET) mixture. The method comprises the following steps;
 a) putting the sufficient amount of fiber in the DSC device,
 b) application of thermal cycle,
 c) recording of liquid output peak area of wool and/or melting peak area of PET read from thermogram obtained from DSC as a result of thermal cycle,
 d) recording of indium peak area read from thermogram obtained from DSC a result of thermal cycle, and
 e) application of water output peak area and/or melting peak area with indium peak area to an equation formed to find the ratio of a wool component and/or the ratio of thermoplastic fiber.

In a preferred embodiment of the invention, thermal cycle provides the steps of increasing at least the analyzed fiber from a constant temperature to a determined point of temperature at a determined speed.

In another preferred embodiment of the invention, in order to find the ratio of wool component, water output peak area and indium peak area are applied to the following equation $$y=(0.4007x+2.972)k$$

wherein "y" is wool ratio, "x" is water output peak area, "k" is indium melting peak area.

In another preferred embodiment of the invention, in order to find the ratio of PET component, melting peak area and indium peak area are applied to the following equation $$(2.2787x+5.1444)k$$

wherein "y" is PET ratio, "x" is melting output peak area, "k" is indium melting peak area.

In another preferred embodiment of the invention, in order to find the ratio of PET component, water output peak area and indium peak area are applied to the following equation $$y=(-0.4007x+97.028)k$$

"y" is PET ratio, "x" is water output peak area, "k" is indium melting peak area.

In a preferred embodiment of the invention, a second thermal cycle is provided by DSC, and the water output peak area in the first thermal cycle and the melting peak area in the second thermal cycle are determined.

In another preferred embodiment of the invention, the second thermal cycle provides the steps of increasing the analyzed fiber at least from a constant temperature to a determined point of temperature at a determined speed.

DESCRIPTION OF THE FIGURES

In FIG. 1, the thermogram provided from DSC is given.

DETAILED DESCRIPTION OF THE INVENTION

In this detailed description, a quantitative analysis method for fiber mixture will be disclosed with the examples with no limited impact for clearly understanding of the subject.

This method is related to a method comprising of using Differential Scanning Calorimetry (DSC) for providing component quantity analysis at fiber types comprising different types of components, for example wool and polyester.

The present invention is related to a fiber analysis method for determining ratio of components in the fiber comprising hydrophobic fiber component and thermoplastic fiber component and characterized in that the method comprises the following steps;
  a) putting of sufficient amount of fiber in the DSC device,
  b) application of thermal cycle,
  c) recording of liquid output peak area of the hygroscopic composition and/or melting peak area of thermoplastic fiber read from thermogram obtained from DSC as a result of thermal cycle,
  d) recording of indium peak area read from thermogram obtained from DSC a result of thermal cycle, and
  e) application of liquid output peak area and/or melting peak area with indium peak area to an equation formed to find the ratio of a hygroscopic composition and/or the ratio of thermoplastic fiber.

The DSC (Differential Scanning Calorimetry) is a measuring device measuring heat quantity under the condition of heating, cooling or waiting in the specific temperature of the sample.

According to this method, the analysis is provided based on the information that water is not available in thermoplastic structures and hydroscopic fibers contains at least a little moisture on their body. In the related method, due to the structure of elements with mentioned components, water output energy wholly depends on the hygroscopic fiber ratios.

Within the scope of method, suitable amount of test specimen taken from the fiber mixture and subject to thermal cycle by DSC.

In DSC methods, thermal cycle, generally indicate the raise of temperature from a constant value to a determined value at a certain rate of increase.

During the mentioned thermal cycle, thermogram print is obtained from DSC and peak areas are determined from the related thermogram. Mentioned peak areas refer to melting energy of thermoplastic component and water output energy of hygroscopic composition.

Besides, indium peak area which is different in each DSC is also provided through thermogram.

The component ratio is calculated by applying peak areas into a linear regression-based equation. The equation is $$Y=(Ax+B)k$$

wherein "y" refers to the component ratio to be determined in the mixture. "y", according to the component to be determined, is hygroscopic component or thermoplastic fiber component, "x", according to the setup of the equation, is water output peak area and melting peak area. Preferably, "x" is water output peak area for hygroscopic component, and melting peak area for thermoplastic fiber component.

"A" and "B" parameters are determined according to the components in the fiber i.e. yarn mixture to be analyzed.

In the mentioned equation, "k" parameter refers to indium peak area. "k" is a special value for each DSC. This mentioned parameter provides method to conduct standard analysis for each DSC of different types.

When the inputs received from thermogram is applied to the equation, the proportional amount of the component to be determined is provided.

Although this method gives result for a fiber comprising a mixture of hygroscopic fiber component and a thermoplastic fiber component, more specifically, it gives better results for a fiber comprising mixture of a natural fiber component and a thermoplastic fiber component. Cotton, linen, viscose or wool can be examples of natural fiber components.

By using the mentioned method, the best results are provided with the fiber mixture of wool-PET (polyester).

Below example application will be explained through the analysis of fiber of wool-PET mixture.

In the room temperature, wool moisture content is 18%. Besides, the wool fiber is decayed without melting at high temperatures. PET, on the other side, is a thermoplastic structure, melting at between 235-260° C. temperature and comprises moisture. Accordingly, the melting peak area provided from thermogram is related with PET, the water output peak area is related only with wool.

EXAMPLE

Firstly, about 3 mg test specimen is taken from the form of yarn or fabric to be put to DSC.

In order to ensure accuracy, calorimeter pan is tared before or after the process. Preferably, a scale with 0.001 precision balance is used. The sample can be weighed on the same scale.

Afterwards, the program input required for mentioned weight and for thermal cycle are entered to DSC, and thermal cycle is started.

In this example, thermal cycle inputs DSC is working as follows;
  Optionally, specimen is waited at 30° C. in isothermal condition
  The temperature is increased up to 280° C. with speed of 10° C./min (first cycle)
  The temperature is decreased to 30° C. with speed of 10° C./min
  The temperature is increased up to 280° C. with speed of 10° C./min (second cycle)
  The temperature is decreased to starting temperature of 30° C. without control.

The peak areas are calculated through thermogram print provided as a result of thermal cycles. The mentioned thermogram print is shown in FIG. 1.

Herein, the water output peak area is calculated from first thermal cycle, and melting peak area is calculated from second thermal cycle.

In the mentioned peak areas, both PET and wool ratios can be calculated.

For the determination of wool content, water output peak area and indium peak area are applied to the below equation $$y=(0.4007x+2.972)k$$

wherein "y" is wool ratio, "x" is water output peak area, "k" is indium peak area. Accordingly, PET ratio can be calculated by subtracting wool ratio from 100.

In another solution, for the determination of PET content, melting peak area and indium peak area are applied to the below equation $$y=(2.2787x+5.1444)k$$

wherein "y" is PET ratio, "x" is melting peak area, "k" is indium peak area. Accordingly, wool ratio can be calculated by subtracting PET ratio from 100.

In one other solution, for the determination of PET content, water output peak area and indium peak area are applied to the below equation $$y=(-0.4007x+97.028)k$$

wherein "y" is PET ratio, "x" is water output peak area, "k" is indium peak area. Accordingly, wool ratio can be calculated by subtracting PET ratio from 100.

The scope of protection of the invention is specified in the attached claims and cannot be limited to the examples described in the detailed description. Inasmuch as it is clear that a person who is skilled in the art can produce similar embodiments in the light of the above-mentioned explanations without leaving the main issue of the invention.

The invention claimed is:

1. A fiber analysis method for determining ratio of components in the fiber mixture comprising hydrophobic fiber component and thermoplastic fiber component, characterized in that it comprises the following steps;
   a) putting of sufficient amount of fiber in the DSC device,
   b) application of thermal cycle,
   c) recording of liquid output peak area of the hygroscopic composition and/or melting peak area of thermoplastic fiber read from thermogram obtained from DSC as a result of thermal cycle,
   d) recording of indium peak area read from thermogram obtained from DSC a result of thermal cycle, and
   e) application of liquid output peak area and/or melting peak area with indium peak area to an equation formed to find the ratio of a hygroscopic composition and/or the ratio of thermoplastic fiber.

2. A fiber analysis method according to claim 1 wherein thermal cycle comprises steps of increasing at least the analyzed fiber from a constant temperature to a determined point of temperature at a determined speed.

3. A fiber analysis method according to claim 1 wherein in order to find the ratio of the thermoplastic component, water output peak area and indium peak area are applied to the following equation $$y=(Ax+B)k$$

wherein "y" is fiber ratio of the thermoplastic component, "x" is the water output peak area, "k" is indium peak area, "A" and "B" are coefficients determined according to the components.

4. A fiber analysis method according to claim 1 wherein in order to find the ratio of the thermoplastic component, melting peak area and indium peak area are applied to the following equation $$y=(Ax+B)k$$

wherein "y" is ratio of the thermoplastic component, "x" is the melting peak area, "k" is indium peak area, "A" and "B" are coefficients determined according to the components.

5. A fiber analysis method according to claim 1 wherein in order to find the ratio of the thermoplastic component, water output peak area and indium peak area are applied to the following equation $$y=(Ax+B)k$$

wherein "y" is fiber ratio of the thermoplastic component, "x" is the water output peak area, "k" is indium peak area, "A" and "B" are coefficients determined according to the components.

6. A fiber analysis method according to claim 1 wherein the second thermal cycle is provided by DSC, and water output peak area in the first thermal cycle and melting peak area in the second thermal cycle are determined.

7. A fiber analysis method according to claim 6 wherein the second thermal cycle includes the steps of increasing at least the analyzed fiber from a constant temperature to a determined point of temperature at a determined speed.

8. A fiber analysis method for determining ratio of components in the fiber comprising a hydrophobic natural fiber component and a thermoplastic fiber component, characterized in that it comprises the following steps;
   a) putting the sufficient amount of fiber in the DSC device,
   b) application of thermal cycle,
   c) recording of liquid output peak area of hygroscopic natural fiber composition and/or melting peak area of thermoplastic fiber read from thermogram obtained from DSC as a result of thermal cycle,
   d) recording of indium peak area read from thermogram obtained from DSC a result of thermal cycle, and
   e) application of water output peak area and/or melting peak area with indium peak area to an equation formed to find the ratio of a hygroscopic natural composition and/or the ratio of thermoplastic fiber.

9. A fiber analysis method according to claim 8 wherein thermal cycle includes the steps of increasing at least the analyzed fiber from a constant temperature to a determined point of temperature at a determined speed.

10. A fiber analysis method according to claim 8 wherein in order to find the ratio of a hygroscopic composition, water output peak area and indium peak area are applied to the following equation $$y=(Ax+B)k$$

wherein "y" is fiber ratio of the hygroscopic component, "x" is water output peak area, "k" is indium peak area, "A" and "B" are coefficients determined according to the components.

11. A fiber analysis method according to claim 8 wherein in order to find the ratio of the thermoplastic component, melting peak area and indium peak area are applied to the following equation $$y=(Ax+B)k$$

wherein "y" is ratio of the thermoplastic component, "x" is the melting peak area, "k" is indium peak area, "A" and "B" are coefficients determined according to the components.

12. A fiber analysis method according to claim 8 wherein in order to find the ratio of the thermoplastic component, water output peak area and indium peak area are applied to the following equation $$y=(Ax+B)k$$

wherein "y" is fiber ratio of the thermoplastic component, "x" is the water output peak area, "k" is indium peak area, "A" and "B" are coefficients determined according to the components.

13. A fiber analysis method according to claim 8 wherein a second thermal cycle is provided by DSC and the water output peak area is determined in the first thermal cycle and the melting peak area is determined in the second thermal cycle.

14. A fiber analysis method according to claim 13 wherein the second thermal cycle includes the steps of increasing the fiber analyzed at least from a constant temperature to a determined point of temperature at a determined speed.

15. A fiber analysis method for determining ratio of components in the fiber comprising wool and polyethylene terephthalate (PET) mixture, characterized in that it comprises the following steps;
  a) putting the sufficient amount of fiber in the DSC device,
  b) application of thermal cycle,
  c) recording of liquid output peak area of wool and/or melting peak area of PET read from thermogram obtained from DSC as a result of thermal cycle,
  d) recording of indium peak area read from thermogram obtained from DSC a result of thermal cycle, and
  e) application of water output peak area and/or melting peak area with indium peak area to an equation formed to find the ratio of a wool component and/or the ratio of thermoplastic fiber.

16. The fiber analysis method according to claim 15 wherein thermal cycle includes the steps of increasing at least the analyzed fiber from a constant temperature to a determined point of temperature at a determined speed.

17. The fiber analysis method according to claim 15 wherein in order to find the ratio of wool component, water output peak area and indium peak area are applied to the following equation $$y=(0.4007x+2.972)k$$

wherein "y" is wool ratio, "x" is water output peak area, "k" is indium melting peak area.

18. The fiber analysis method according to claim 15 wherein in order to find the ratio of PET component, melting peak area and indium peak area are applied to the following equation $$(2.2787x+5.1444)k$$

wherein "y" is PET ratio, "x" is melting output peak area, "k" is indium melting peak area.

* * * * *